(12) United States Patent
Larson (10) Patent No.: US 7,327,496 B2
(45) Date of Patent: Feb. 5, 2008

(54) IMAGING APPARATUS AND METHOD (75) Inventor: Bradley R. Larson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 985 days.

(21) Appl. No.: 10/412,108

(22) Filed: Apr. 11, 2003

(65) Prior Publication Data

US 2004/0201868 A1 Oct. 14, 2004

(51) Int. Cl.
*H04N 1/409* (2006.01)
*H04N 1/407* (2006.01)
*G06T 5/50* (2006.01)

(52) U.S. Cl. .................... 358/3.26; 382/275

(58) Field of Classification Search ............. 358/3.26, 358/471, 474, 463, 464; 382/275
See application file for complete search history.

(56) References Cited

U.S. PATENT DOCUMENTS

| 5,646,744 | A | * | 7/1997 | Knox ..................... 358/401 |
|---|---|---|---|---|
| 5,767,987 | A | | 6/1998 | Wolff et al. |
| 5,789,729 | A | | 8/1998 | Yamamoto |
| 5,973,792 | A | * | 10/1999 | Matsuda ................ 358/448 |
| 6,035,072 | A | | 3/2000 | Read |
| 6,067,385 | A | * | 5/2000 | Cullen et al. ............ 382/275 |
| 6,069,984 | A | | 5/2000 | Sadler et al. |
| 6,101,283 | A | * | 8/2000 | Knox ..................... 382/254 |
| 6,288,798 | B1 | * | 9/2001 | Sharma .................. 358/448 |
| 6,344,906 | B1 | | 2/2002 | Gatto et al. |
| 6,384,941 | B1 | | 5/2002 | Ryu |
| 6,862,117 | B1 | * | 3/2005 | Ford et al. .............. 358/475 |
| 7,006,708 | B1 | * | 2/2006 | Nako et al. ............. 382/294 |
| 2003/0218781 | A1 | * | 11/2003 | Suino ..................... 358/3.26 |

* cited by examiner

*Primary Examiner*—Thomas D. Lee (57) ABSTRACT

An imaging apparatus includes a first sensor for imaging a first side of an object and a second sensor for imaging a second side of an object. The imaging apparatus also includes an information handling system for generating a negative image of the second side, and a background generator for displaying the negative image of the second side. A method for imaging includes imaging a second side of an object; and producing a negative of an image on the second side; and summing the negative of the image on the second side with the image of the second side.

31 Claims, 7 Drawing Sheets

IMAGING APPARATUS AND METHOD

BACKGROUND INFORMATION

Scanning devices may include a white background on which the page of media to be scanned is placed. The reason for the white background is that majority of the pages of media to be scanned also have a white background. Many pages of media that are scanned have an image only on one side of the page of media. Other pages of media are relatively thick so that any image on the side of the media opposite the side being scanned are not seen in the background of the image of the scanned page of media. However, there are problems with scanning paper or other thin media that has an image on the opposite or backside of the media. When scanning thin media with an image on the opposite or backside of the media, the background of the scanned image may include portions from the opposite or backside of the media. Actually, a negative of the image on the backside of the page of media may be present in the image as scanned. This problem is generally referred to as bleed through.

DETAILED DESCRIPTION

In the following detailed description of the preferred embodiments, reference is made to the accompanying drawings that form a part hereof, and in which are shown by way of illustrating specific embodiments of the invention which may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of present inventions. The following detailed description, therefore, is not to be taken in a limiting sense, and the scope of various embodiments of the invention is defined only by the appended claims, along with the full range of equivalents to which such claims are entitled.

Figure 1:
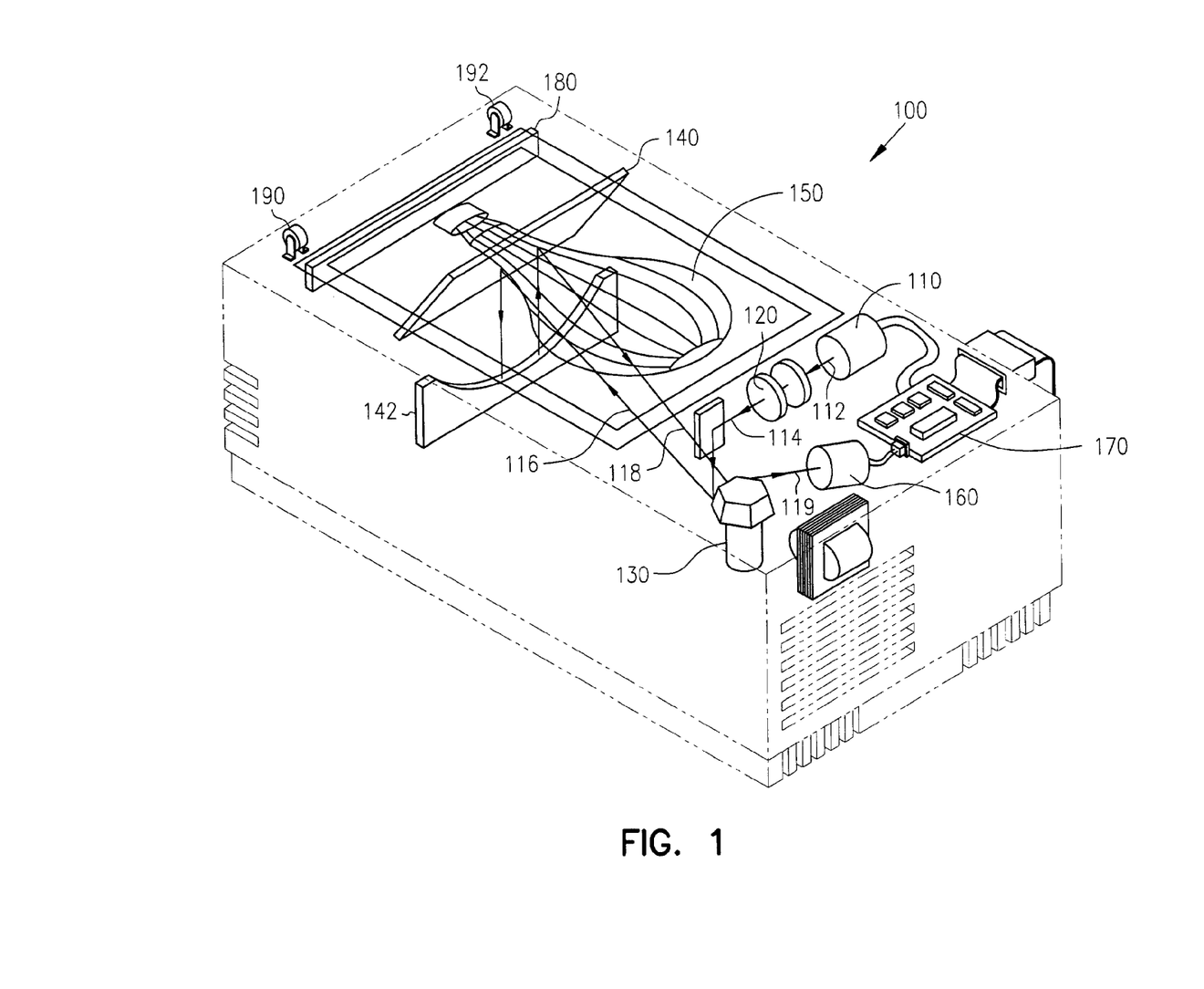
FIG. 1 is a perspective view of an imaging apparatus according to an embodiment of the invention.

FIG. 1 is a perspective view of an imaging apparatus 100 according to an embodiment of this invention. FIG. 1 shows one type of imaging apparatus 100 which is referred to as a scanner. The imaging apparatus includes a laser 110. A laser beam 112 is output from the laser 110 and is focused by at least one lens 120. The focused laser beam 114 is directed at a spinning multifaceted mirror 130. As the multifaceted mirror 130 spins, the laser beam 116 is deflected rapidly from left to right. Mirrors 140, 142 direct the scanning beam onto the primary or first side of an object 150 that is being imaged, reproduced or scanned. As shown in this embodiment, the object 150 is a document. Light is reflected back from the first side of the original and back to the spinning multifaceted mirror 130, as depicted by reference numeral 118. The spinning multifaceted mirror 130 directs the reflected light 118 to a photosensor 160, as depicted by the light path 119. The photosensor 160 translates the intensity and color of the beam 119 into electronic signals which are then passed to an information handling system 170 for processing. These elements describe the primary scanner or imager associated with the imaging device 100. It should be noted that FIG. 1 shows one type of primary scanner and that other types of primary scanners can be used, including simpler scanners and more complex scanners.

In addition to the primary scanner, the imaging apparatus 100 includes a secondary scanner 180. The secondary scanner 180 images the back side or second side of the media or the object 150. The back side image does not necessarily have to be at as high a resolution as the front side or primary image. As a result, the secondary scanner 180, in some embodiments, can have a resolution which is less than the resolution of the primary scanning apparatus which scans the side of the media, document or object 150 having the image that is to be scanned or reproduced. Of course, in other embodiments the laser is replaced with a light bar that includes a Xenon bulb, or fluorescent light source or the like. It should be noted that as shown in FIG. 1, the cover for the scanner has been removed in order to facilitate illustration of an embodiment of this invention. It should also be noted that the scanning apparatus 100 includes a mechanism for transporting the paper document, media, or the object 150 past both the primary scanning apparatus and the secondary scanning apparatus 180. Rollers 190, 192 represent the paper transport apparatus associated with the imaging apparatus 100.

In one embodiment of the invention, the secondary scanning apparatus 180 is a unit which is sold separately as an add-on to an existing imaging apparatus 100. In another embodiment of this invention, the secondary scanning unit 180 and the primary scanning unit depicted by elements 110, 120, 130, 140, 142, 160 and 170 are sold as part of an integral imaging apparatus 100.

Figure 2:
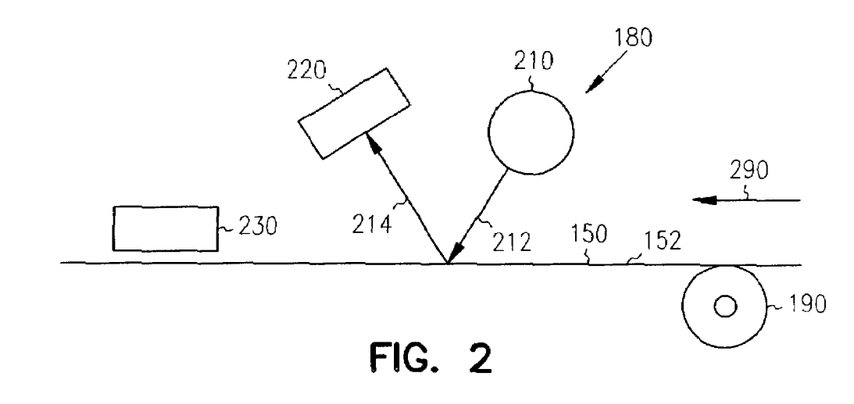
FIG. 2 is a schematic view of an imaging apparatus according to another embodiment of this invention.

FIG. 2 is a schematic view of an imaging apparatus according to another embodiment of this invention. FIG. 2 shows the secondary scanning apparatus 180. Also shown in FIG. 2 is an object such as a thin media such as paper 150. A roller 190 is used to transport the object 150 in the direction depicted by arrow 290. The secondary scanning unit 180 includes an illumination source 210, such as a laser. The illumination source 210 directs light to the back side 152 or the second side of the object 150. The light from the illumination source 210 is depicted by arrow 212. The secondary scanning apparatus also includes a sensor 220, such as a photosensor. Light that is reflected from the surface 152 of the object 150 is directed to the sensor 220, as depicted by arrow 214. The color intensity of the reflected light beam 214 is translated into electronic signals by the sensor 220. The secondary scanning unit also includes a background generator 230. The background generator 230 includes an array that can produce a negative of the image sensed by the sensor 220. The background generator 230 can be a liquid crystal display which extends across the object 150 or can be an array of light-emitting diodes or similar light-emitting device. It should be noted that the secondary scanning unit 180 can include the illumination source 210, the sensor 220 and the background generator 230 as a singular unit in one embodiment. In another embodiment of this invention, the background generator 230 could be separate from the illumination source 210 and the sensor 220.

Figure 3:
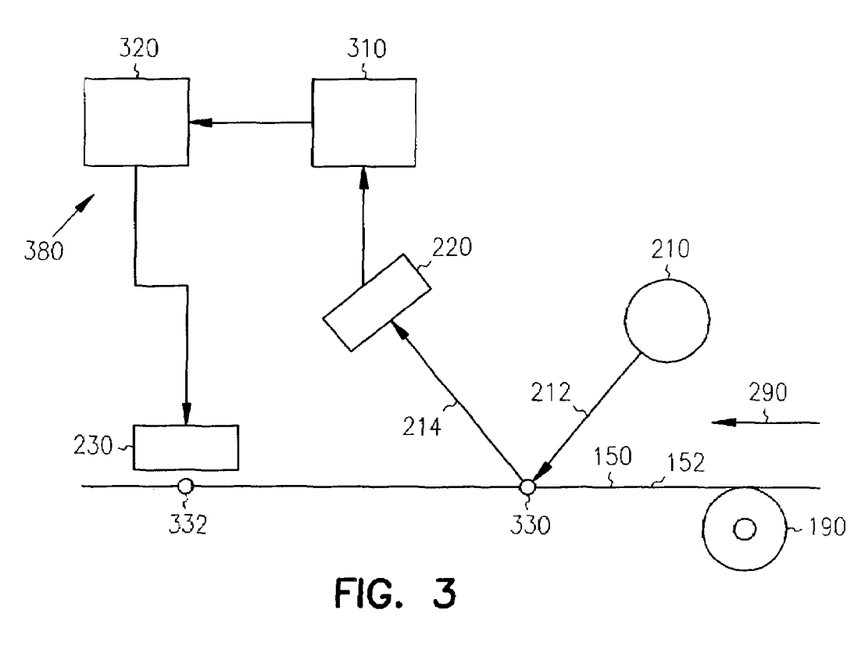
FIG. 3 is a schematic view of an imaging apparatus according to yet another embodiment of this invention.

FIG. 3 shows another embodiment of the secondary scanning unit 380. This particular embodiment of the invention includes a source of illumination 210 which produces a light beam or laser light 212 directed at the second or back side surface 152 of the object 150. The light reflected from the surface 152, as depicted by reference numeral 214, is directed to the sensor 220 which translates the light into electrical signals for processing by an information handling system 310. The information handling system 310 can be a microprocessor or a dedicated controller or it can be an entire computer system. The information handling system 310 produces a negative image of the image found on the back side or second surface 152 of the object 150 and outputs it to a memory 320. The negative produced is output from the memory 320 to the background generator 230.

In one embodiment of the invention, the memory is a first-in, first-out ("FIFO") memory. The FIFO memory is used to delay the negative image. In one embodiment of this invention, the FIFO memory 320 is selected so that the amount of delay produced by processing the data to produce a negative at the information handling system 310, and the time in the FIFO memory 320 equals or substantially equals the length of time it takes the object 150 to travel between the point 330 where the secondary imaging unit obtains the image and the point 332 where the background generator 230 produces a negative of the image. The timing or the amount of time between point 330 and point 332 is determined by knowing the rate at which the object 150 is moved. If the roller 190 moves the object 150 at a known rate of units per second, the distance between points 330 and 332 is divided by the rate to yield the amount of time it takes the object 150 to move between points 330 and 332.

Figure 4:
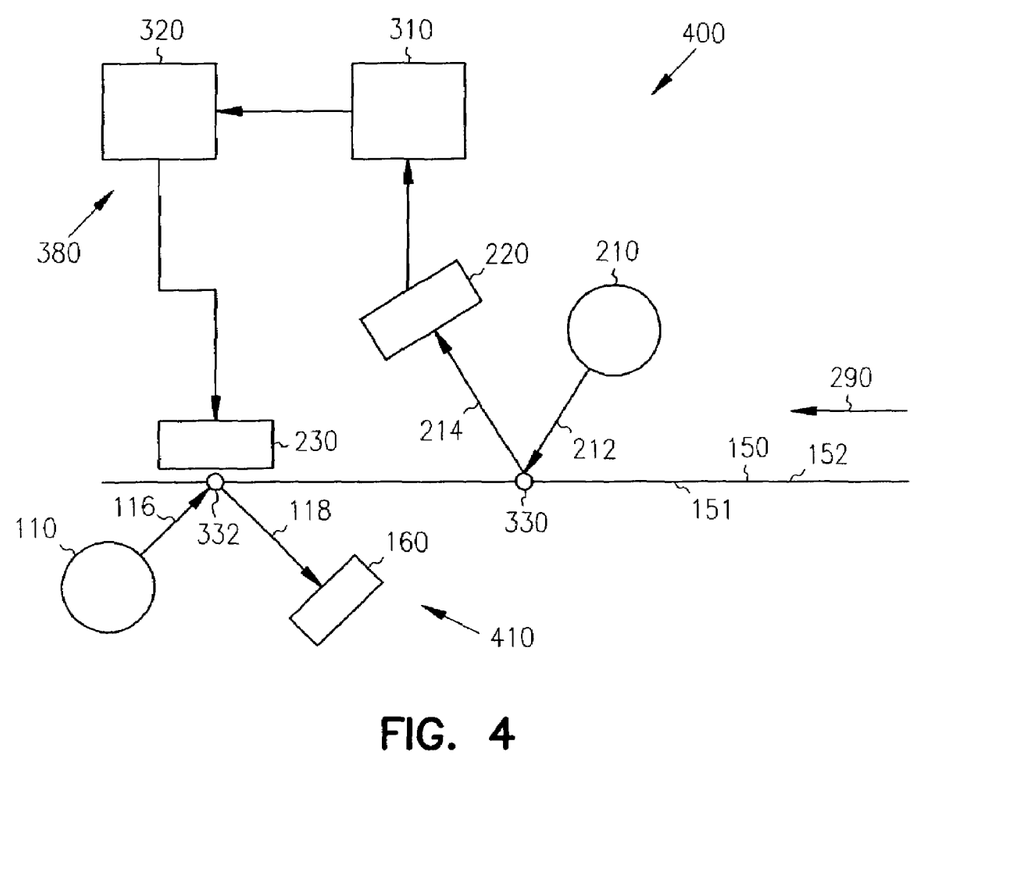
FIG. 4 is a schematic view of an imaging apparatus according to still another embodiment of this invention.

FIG. 4 is a schematic view of an imaging apparatus 400 according to yet another embodiment of this invention. The imaging apparatus 400 includes a primary scanning unit 410 for imaging the first side or front side 151 of an original or object 150. The primary scanning unit or imaging unit is depicted by the reference numeral 410 and includes a laser 110 producing light beams 116 directed toward the surface 151 of the object 150 at point 332. Light beams 118 reflected from the primary or first surface 151 of the object 150 are directed to a photosensor 160. At the photosensor the color and intensity of the light is changed into electronic signals for use in producing the image. The information handling system 170 produces an image (shown in FIG. 1).

The apparatus 400 also includes the secondary imaging apparatus 380. The secondary imaging apparatus 380 is essentially the same as the secondary imaging apparatus described above with respect to FIG. 3. An abbreviated description of the secondary scanning apparatus 380 included here. A source of illumination 210 produces a light beam 212 which is directed to the second or back side 152 of the object 150. Reflected light, as depicted by reference numeral 214, is directed to a sensor 220. The output of the sensor 220 is input to an information handling system 310 which produces a negative of the image on the back side or secondary surface 152 of the object 150. The negative of the image is output from the information handling system 310 to a memory unit 320, such as a FIFO. The processing at the information handling system and the FIFO memory 320 delays the negative of the image. The FIFO 320 is selected so that the delay between point 330 and point 332 is equal or substantially equal to the time it takes for the object 150 to move the distance between points 330 and 332. The negative image passes through the FIFO memory 320 and is output at the background generator 230 at the second or back side surface of the object 150.

The timing or delay of the negative image allows for a summing of the negative image of the back side surface and the image of the back side surface which was scanned or imaged at point 330 and is now at point 332. In other words, the portion of the back side surface 152 of the object 150 which was previously at point 330 is now at point 332 by the time the negative of the image is produced and the negative image passes through the FIFO memory 320 and is reproduced at the background generator 230. At point 332, the primary imaging apparatus 410 is imaging the front side or primary side 151 of the object while substantially simultaneously at the point 332, the background generator 230 is producing a negative of the image as it passes by point 332. In other words, the background generator 230 is filling in the background or second side image so as to produce a substantially uniform background on the primary side or front side 151 while it is being imaged by the primary imaging or scanning device 410. The effect is the summing of the portion of the image on the second or back side of the object 150 which has traveled from point 330 to point 332 with the portion of the negative of the image to produce a substantially uniform background at point 332 while the primary imaging device or scanner is scanning the front side or first side 151 of the object 150. The effect of summing the image of the second side with a negative of the image of the second side 152 is that a substantially uniform background will be produced on the front side or primary side 151 of the object or media 150. In other words, if an object 150 is thin such that it is either transparent or translucent and bleedthrough occurs, the summation of the image on the back side with a negative of the image at point 332 will produce a substantially uniform bleedthrough so that the background of the primary image found on the primary or front side 151 of the object has a substantially uniform background. The primary scanner or imaging apparatus 410 can then adjust for the background and produce the appropriate amount of contrast and white level so as to effectively substantially reduce bleedthrough from specific images on the back side or secondary surface 152 of the object 150.

Figure 5A:
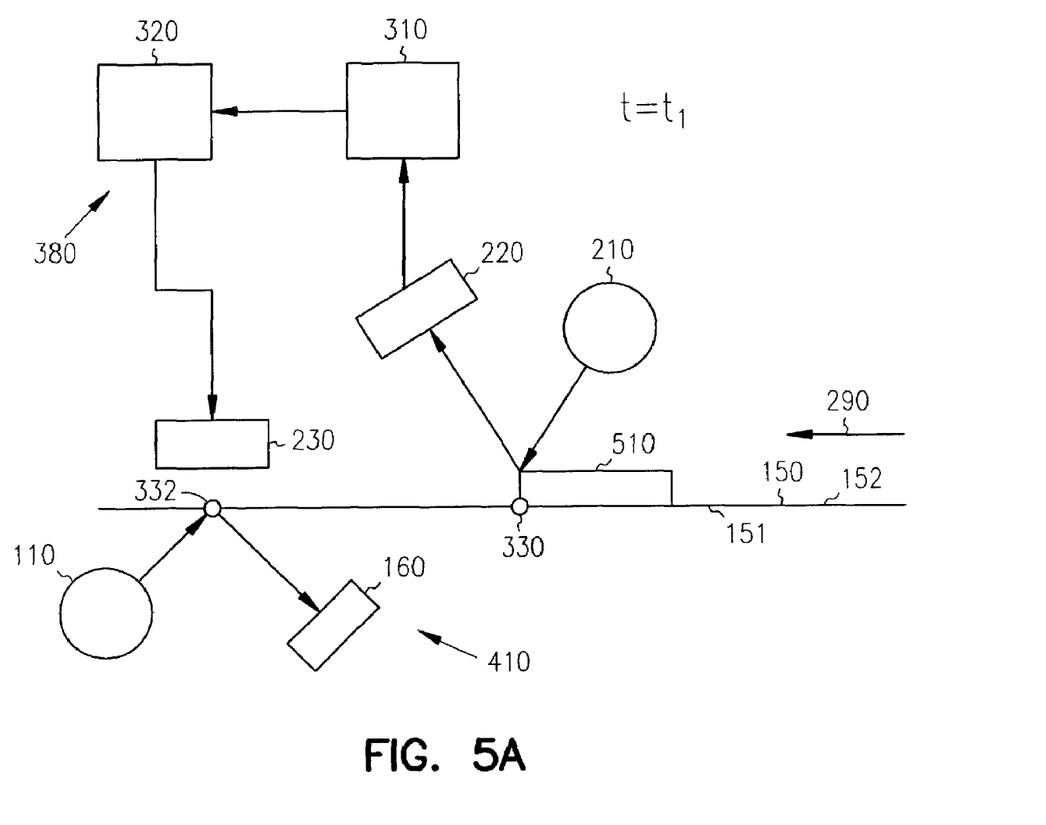
FIG. 5A is a schematic drawing of an embodiment of this invention at a time $t_1$, where the second or back side surface has an image thereon.
Figure 5B:
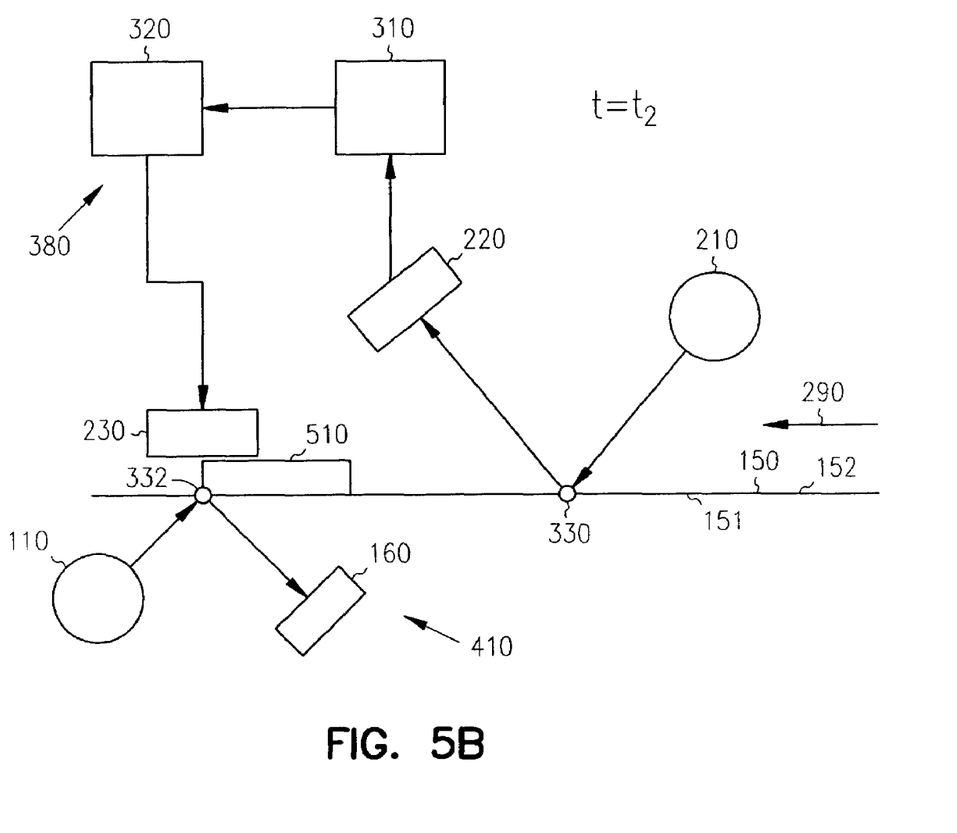
FIG. 5B is a schematic drawing of an embodiment of an invention at a time $t_2$, where the second or back side surface has an image thereon.

FIGS. 5A and 5B are schematic drawings of an embodiment of the invention at a time $t_1$, and at a time $t_2$, respectively, where the second or back side surface 152 of an object 150 has an image 510 thereon. As shown in FIG. 5A, the front edge of the image 510 which is traveling in the direction of the arrow designated 290 reaches point 330 and is scanned by the secondary scanning apparatus 380. The results of the scan of the back side or secondary surface 152 are received by the sensor 220 and a negative is produced at the information handling system 310. The negative produced is output to the FIFO memory 320 and a negative image is generated at the background generator 230 at the time $t_2$. At the time $t_2$, the image 510 on the object or media 150 has traveled so that the front edge is now positioned at point 332. The background generator then produces a negative of the front edge of the image 510 which fills in or is summed with the front portion or front side edge of the image 510 which is traveling in the direction 290. Thus, at time $t_2$, the background generator 230 is producing a negative of the image at point 332 while the front edge of the image 510 is passing beneath the background generator 230. At approximately or substantially the same time, the primary imaging apparatus 410 is scanning the front side or primary surface 151 of the media 150.

Figure 6:
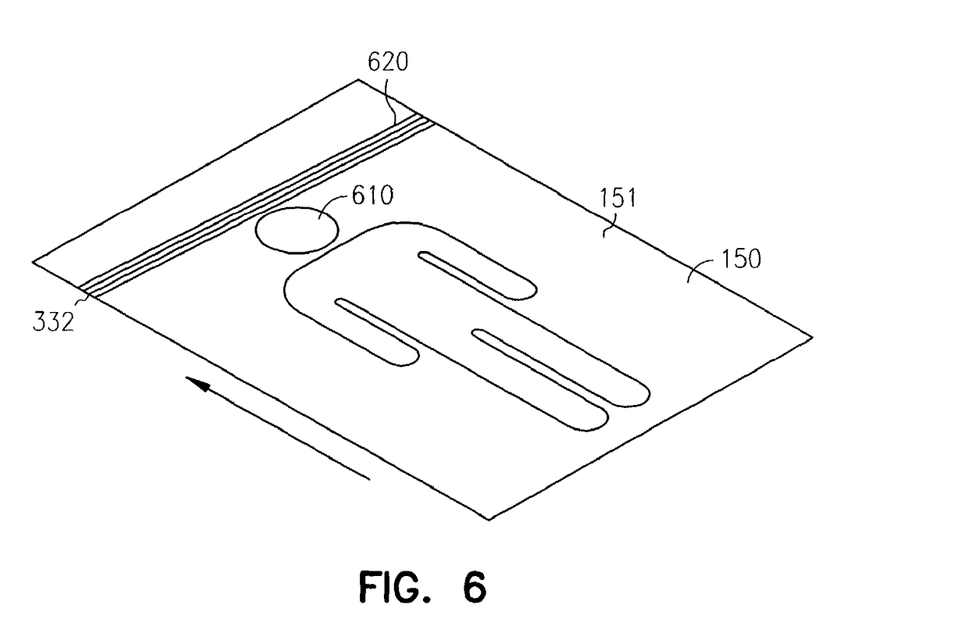
FIG. 6 is a view toward the primary surface of an object which has a stickman object bleeding through from the secondary surface.

FIG. 6 is a view toward the primary surface 151 of an object 150 such as a piece of paper or other thin media which has a stickman object that would normally bleed through from the secondary surface 152 (shown in FIGS. 2, 3, 4, 5A, 5B). Point 332 actually is a line that traverses the object 150. FIG. 6 shows the view from the primary surface 151 at time $t_2$. The objects 610 which correspond to the bleedthrough of the object 510 at the primary or first surface 151 is at point 332. The background generator 230 (shown in FIGS. 2, 3, 4, 5A, 5B) produces a negative image 620 at line 332. Thus, bleedthrough image 610 and the image produced by the background generator 620 are summed to produce a substantially uniform background along line 332 while the front side surface 151 or primary surface is being scanned or imaged. In essence, the background generator fills in or sums with the image 510 on the back side surface so as to produce a substantially uniform background on the front side or primary surface 151 in the area near the line 332.

Figure 7:
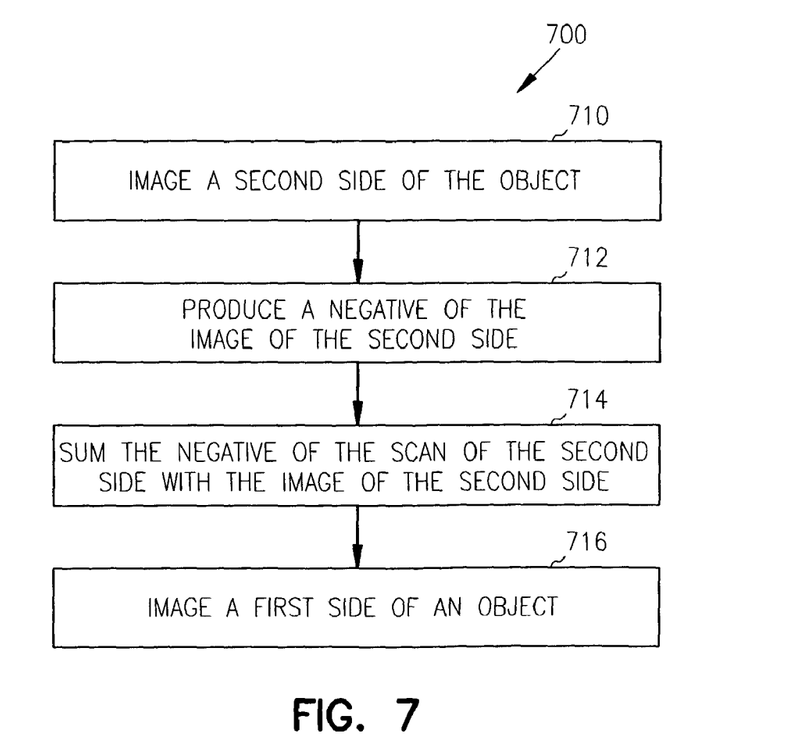
FIG. 7 is a flow diagram illustrating a method according to an embodiment of the invention.

FIG. 7 is a flow diagram illustrating a method 700 according to an embodiment of the invention. Initially, a second side of the object 150 is imaged, as depicted by reference numeral 710. After the second side of the object 150 is imaged, a negative of the image of the second side 152 is produced at the image generator 230, as depicted by reference numeral 712. As a result, the negative of the scan of the second side 152, the image of the second side 152 is summed, as depicted by reference numeral 714. Substantially simultaneously with the summing of the negative of the scan of the second side and the image of the second side, an image of the first side of an object is obtained by the primary scanning device 410, as depicted by reference numeral 716. The information handling system 310 can operate in various ways for various embodiments of the invention. For example, the information handling system 310 can produce a negative of the scan of the second side which is less dark than the image 510 found on the second side 152 of the object 150. In another embodiment, the level of darkness associated with the negative of the second side can be varied for varying levels of darkness of the image 510 found on the second or back side 152 of the object or media 150. In another embodiment, the darkest portion of the negative of the scan of the second side is substantially as dark as the darkest of the darkness levels associated with a negative image of the second side on the first side.

In still another embodiment, a self-luminous negative generator positioned near the second side 152 of the object 150 is used to lighten the darker portions of the object or media 150 so that the bleed through of the object 510 onto the first or primary side 151 is reduced. A self-luminous negative generator generally includes a back-lit liquid crystal display ("LCD") or an array of small light emitting diodes ("LED").

In some embodiments, the operation of summing the image 510 and the negative of the image 510 on the second side 152 of the object 150 includes matching the portion of the image 610 with the negative image 620 produced. In some embodiments, the negative image may be rotated or translated in order to form a match of the image 610 and the negative of the image 620.

The information handling system 170 associated with the primary scanning apparatus 410 associated with the primary or front side 151 of the object 150 can shift the contrast of the image on the first side 151 in response to the amount of correction applied by summing the produced negative 620 of the second image with the image 610 on the second side 152. Of course, as can be seen in FIGS. 4, 5A and 5B, the imaging of the second side 152 of the object 150 precedes the imaging of the first side 151 of the object 150. It should also be noted that the imaging of the second side 152 can be done at a lower resolution than the imaging done of the first side 151 in some embodiments. The primary imaging apparatus 410 can also shift the white point as well as the contrast to compensate for the amount of summing done by the background generator 230. The sensors 220 and 160 can be scan sensors. The sensors 220, 160 can also be monochrome or color sensors. In addition, in some embodiments, one of the sensors 220 may be monochrome while the other of the sensors 160 may be a color sensor.

Figure 8:
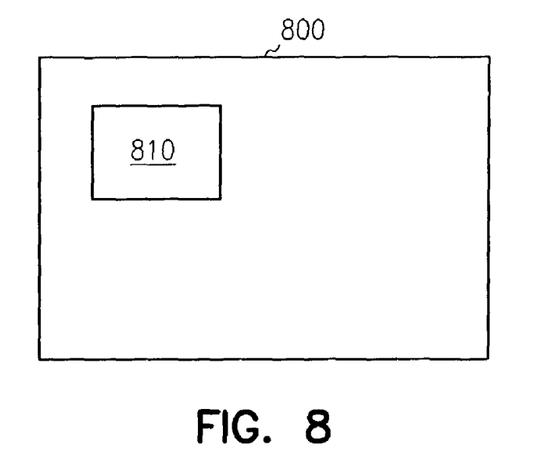
FIG. 8 is a schematic diagram illustrating a computer readable medium and associated instruction set according to an embodiment of the invention.

FIG. 8 is a schematic diagram illustrating a computer-readable medium 800, an associated instruction set 810, according to an embodiment of this invention. The computer-readable medium 800 can be any number of computer-readable medium including a floppy drive, a hard disk drive, a network interface, an interface to the internet, custom hardware, application specific integrated circuit ("ASIC"), field programmable gate array ("FPGA"), or the like. The computer-readable medium can also be a hard-wired link for a network or be an infrared or radio frequency carrier. The instruction set 810 can be any set of instructions which are executable by an information handling system associated with the printing apparatus discussed. For example, the instruction set may include the method 700 discussed with respect to FIG. 7 above. Other instruction sets may also be placed on the computer-readable medium 800.

Figure 9:
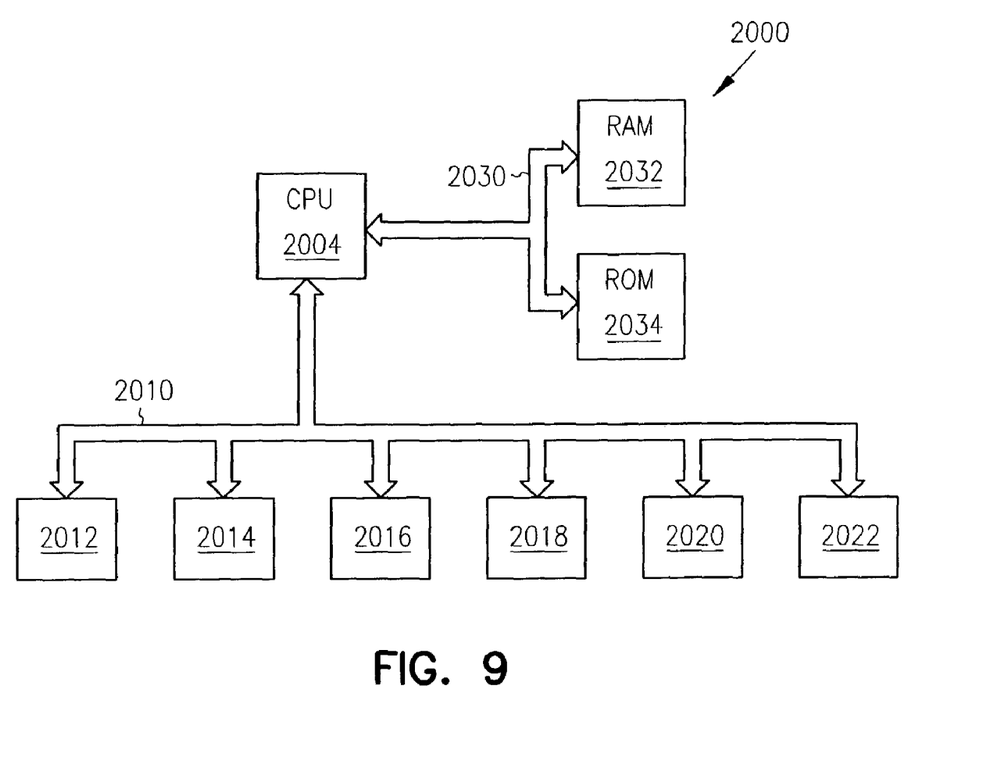
FIG. 9 is a schematic view of a controller according to an embodiment of the invention.

FIG. 9 is a schematic view of one embodiment of an information handling system 170, 310. In one embodiment, the information handling system 170, 310 can be one which includes a central processing unit 2004, a random access memory 2032, and a system bus 2030 for communicatively coupling the central processing unit 2004 and the random access memory 2032. The information handling system 170, 310 can also include an input/output bus 2010 and several peripheral devices, such as 2012, 2014, 2016, 1018, 2020, and 2022 may be attached to the input/output bus 2010. Peripheral devices may include hard disc drives, magneto-optical drives, floppy disc drives, monitors, keyboards and other such peripherals. The information handling system 170, 310 is programmable and acts in response to program instructions. A software program is loaded onto the information handling system 170, 310. The software program provides control functions which a user can use to select and implement the various processes described in the above paragraphs. The information handling system 170, 310 can also be a microprocessor and memory in some embodiments. In other embodiments, the information handling system 170, 310 is a dedicated controller. In some embodiments, a single information handling system 170, 310 processes imaging data for both the primary imaging apparatus 410 and the secondary imaging apparatus 380.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of Embodiments of the Invention, with each claim standing on its own as a separate preferred embodiment.

What is claimed is:

1. A method for imaging comprising:
   imaging a first side of the object;
   imaging a second side of an object; and
   producing a negative of an image on the second side; and
   summing the negative of the image on the second side with the image of the second side; and
   shifting a contrast on a image of the first side in response to an amount of correction applied by summing the produced negative of the second side with the image on the second side.

2. The method for imaging of claim 1 wherein producing a negative of the image on the second side includes producing a negative that is less dark than the image on the second side.

3. The method for imaging of claim 1 wherein producing a negative of the image on the second side includes:
   locating the negative of the image of the second side on the first side; and
   determining darkness levels of the negative of the image on the second side on the first side.

4. The method for imaging of claim 1 wherein summing further comprises matching the produced negative of the image to the image on the second side.

5. The method for imaging of claim 4 wherein matching the negative of the image on the second side to the produced negative image includes:
   rotating the produced negative of the image; and
   translating the produced negative of the image.

6. The method for imaging of claim 1 wherein imaging the second side of the object is performed at a lower resolution than the imaging of the first side on the page.

7. The method for imaging of claim 1 further comprising shifting the white point on the image of the first side in response to an amount of correction applied by summing the produced negative of the second side with the image on the second side.

8. The method for imaging of claim 1 and wherein imaging the first side of the object follows imaging the second side of an object.

9. The method for imaging of claim 8 wherein imaging the first side of an object and imaging the second side of an object includes imaging the first side and the second side of a document.

10. The method for imaging of claim 8 wherein imaging the first side of an object and imaging the second side of an object includes scanning the first side of the object and the second side of the object.

11. A method for imaging comprising:
   imaging a second side of an object;
   producing a negative of an image on the second side;
   summing the negative of the image on the second side with the image of the second side;
   locating the negative of the image of the second side on the first side;
   determining darkness levels of the negative of the image on the second side on the first side; and
   producing a negative substantially as dark as the darkest of the darkness levels associated with the negative of the image on the second side on the first side.

12. The method for imaging of claim 11 wherein producing a negative of the image on the second side further includes producing a negative having varying levels of darkness, wherein the darkest portion of the negative of the image on the second side is substantially as dark as the darkest of the darkness levels associated with the negative of the image on the second side on the first side.

13. A method for imaging comprising:
   imaging a first side of the object;
   imaging a second side of an object; and
   producing a negative of an image on the second side; and
   summing the negative of the image on the second side with the image of the second side; and
   shifting the white point on the image of the first side in response to the amount of correction applied by summing the produced negative of the image on the second with the image and the image on the second side.

14. A computer readable medium having instructions for causing an information handling system to perform a method, the method comprising:
   imaging a second side of an object; and
   producing a negative of an image on the second side; and
   summing the negative of the image on the second side with the image on the second side,
   wherein producing a negative of the scan of an image on the second side further includes producing a negative image substantially as dark as the darkest of the plurality of darkness levels associated with the negative image of the second side.

15. The computer readable medium of claim 14 if wherein producing a negative of an image on the second side further includes:
   locating the image of the second side; and
   determining a plurality of darkness levels of the negative image of the second side on a first side of the object.

16. The computer readable medium of claim 14 further comprising imaging a first side of an object as the negative of the second side is summed with the image on the second side.

17. A computer readable medium having instructions for causing an information handling system to perform a method, the method comprising:
   imaging a second side of an object; and
   producing a negative of an image on the second side; and
   summing the negative of the image on the second side with the image on the second side,
   wherein producing a negative image on the second side further includes producing a negative having varying levels of darkness, wherein the darkest portion of the negative image on the second side is substantially as dark as the darkest of the darkness levels associated with the negative image of the second side on the first side.

18. An imaging apparatus comprising:
   a first sensor for imaging a first side of an object;
   a second sensor for imaging a second side of an object;
   an information handling system for generating a negative image of the second side; and
   a background generator for displaying the negative image of the second side, wherein the sensor for imaging the first side of the object compensates for a shift in a white point value.

19. The imaging apparatus of claim 18 wherein the information handling system sums the negative of the image of the second side with the image of the second side during the scan of the first side.

20. The imaging apparatus of claim 19 wherein the sensor for imaging the first side of the object adjusts a contrast value based on the scan of the first side of the object as the negative of the image presented of the second side of the object is summed with the image on the second side of the object.

21. The imaging apparatus of claim 20 wherein the maximum capable resolution of the second scan sensor is lower than the maximum capable resolution of the first scan sensor.

22. The imaging apparatus of claim 20 wherein one of the first scan sensor and the second scan sensor is a monochrome scan sensor.

23. The imaging apparatus of claim 19 wherein the sensor for imaging the first side of the object compensates for a shift in a contrast value.

24. The imaging apparatus of claim 18 wherein the first sensor and the second sensor are scan sensors.

25. The imaging apparatus of claim 18 wherein for the background generator produce a negative image of the second side.

26. The imaging apparatus of claim 25 further comprising a first in, first out memory for storing a negative image of the second side.

27. An imaging apparatus for imaging an object comprising:
   a sensor for imaging the second side of an object;
   means for producing a negative image of the second side;
   means for summing the negative of the image of the second side with the image of the second side;
   a memory for storing the negative image; and
   a background generator, wherein the background generator projects the negative of the image on the second side onto the second side of the object.

28. The imaging apparatus of claim 27 wherein the means for summing the negative image of the second side with the image of the second side includes a memory for storing the negative image.

29. The imaging apparatus of claim 27 further comprising a sensor for imaging a first side of an object.

30. The imaging apparatus of claim 27 wherein the means for summing the negative image of the second side with the image of the second side includes a microprocessor.

31. The imaging apparatus of claim 27 further comprising a sensor for imaging a first side of an object,
   wherein the background generator adds the negative of the second image to the second image so produce a substantially uniform background as the first sensor images the first side of the object.

* * * * *

UNITED STATES PATENT AND TRADEMARK OFFICE
CERTIFICATE OF CORRECTION

| | | |
|---|---|---|
| PATENT NO. | : 7,327,496 B2 | Page 1 of 1 |
| APPLICATION NO. | : 10/412108 | |
| DATED | : February 5, 2008 | |
| INVENTOR(S) | : Bradley R. Larson | |

It is certified that error appears in the above-identified patent and that said Letters Patent is hereby corrected as shown below:

In column 8, line 58, in Claim 15, after "claim 14" delete "if".

Signed and Sealed this

Twelfth Day of August, 2008

JON W. DUDAS
*Director of the United States Patent and Trademark Office*